United States Patent [19]
Petri

[11] Patent Number: 5,343,669
[45] Date of Patent: Sep. 6, 1994

[54] GROMMET STRIP

[76] Inventor: Hector D. Petri, 384 Edmands Rd., Framingham, Mass. 01701

[21] Appl. No.: 909,334

[22] Filed: Jul. 6, 1992

[51] Int. Cl.$^5$ .................................................. E04C 2/38
[52] U.S. Cl. ...................... 52/716.8; 49/462; 49/490.1; 49/441; 52/823
[58] Field of Search ............... 52/716.7, 716.8, 717.03, 52/211, 212, 208, 204.54, 242, 287, 288, 312, 601, 631, 85, 88, 89, 813, 821–824; 49/475.1, 490.1, 462, 440, 441

[56] References Cited

U.S. PATENT DOCUMENTS

| | | | |
|---|---|---|---|
| 4,196,546 | 4/1980 | Bright | 49/440 X |
| 4,379,376 | 4/1983 | Adell | 52/717.03 X |
| 4,437,916 | 3/1984 | Adell | 49/462 X |
| 4,443,508 | 4/1984 | Mehl | 52/716.8 X |
| 4,520,593 | 6/1985 | Adell | 49/462 |
| 4,581,807 | 4/1986 | Adell | 49/462 X |
| 4,769,966 | 9/1988 | Petri | 49/462 X |

FOREIGN PATENT DOCUMENTS

| | | | |
|---|---|---|---|
| 727929 | 2/1966 | Canada | 49/462 |

Primary Examiner—Carl D. Friedman
Assistant Examiner—Lan C. Mai
Attorney, Agent, or Firm—John E. Toupal; Harold G. Jarcho

[57] ABSTRACT

A grommet strip for mounting along an exposed edge of a wall and including a spring tempered metal substrate strip comprising an elongated base portion and a plurality of spaced apart finger portions forming strip voids and extending in a common direction from each longitudinal edge thereof and substantially normal thereto, the inner surfaces of the base and finger portions forming an elongated channel with an open end opposite to the base portion and adapted to receive the edge of the wall with the inner surface of the base portion engaging the exposed edge and the inner surfaces of the finger portions engaging marginal sections of the wall directly adjacent thereto. A resilient, non-metalic coating covers outer surface portions of the base portion so as to provide an elongated resilient surface along the exposed edge, but has limited bounds that establish coating voids coextensive with the strip voids and therewith provide transverse openings into the channel. In addition, the coating forms over exposed edge lengths of the base portion between adjacent finger portions edge surfaces that intersect the outer surface of the base portion at angles substantially greater than 90°.

19 Claims, 1 Drawing Sheet

GROMMET STRIP

BACKGROUND OF THE INVENTION

This invention relates generally to a grommet strip for covering an exposed edge of a wall and, more particularly, to an electrically insulating grommet strip for covering the exposed edges of openings in electrical equipment housings.

Electrical equipment housings frequently possess openings for the passage of electrical wires. Generally, such openings are equipped with grommets or bushings that cover and insulate the exposed edges of the openings. A common grommet is made of rubber or a similar resilient material and consists of a pair of annular spaced apart flange portions internally joined by a cylindrical portion. The cylindrical portion projects through an opening and the flange portions engage the peripheral wall portions thereof. Disadvantages of such grommets include the requirement for large inventories to accommodate openings of various size, and their inapplicability to openings of other than circular shape.

The above problems are somewhat alleviated by a grommet strip having a flat, elongated base from opposite edge of which project longitudinally spaced apart pair of fingers. The strip can be cut to desired length and then applied to an opening with the base engaging the edge of the opening and the fingers engaging peripheral portions thereof. Such a grommet strip is disclosed in British Patent No. 849,761. However, certain disadvantages persist for even the above described grommet strip. For example, the installation of the grommet strip into openings of complex shape requires the use of an adhesive and is, therefore, quite labor intensive.

An improved grommet strip is disclosed in U.S. Pat. No. 4,769,966. That grommet strip comprises a resiliently coated spring tempered substrate strip which can be securely mounted over an exposed edge of a wall without the use of adhesives. However, in certain instances the exposed, relatively sharp edges on the strip can cause abrasion damage to engaged insulation on electrical wires.

The object of this invention, therefore, is to provide an improved grommet for covering the exposed edges of openings in electrical housings.

SUMMARY OF THE INVENTION

The invention is a grommet strip for mounting along an exposed edge of a wall and including a spring tempered metal substrate strip comprising an elongated base portion and a plurality of spaced apart finger portions forming strip voids and extending in a common direction from each longitudinal edge thereof and substantially normal thereto, the inner surfaces of the base and finger portions forming an elongated channel with an open end opposite to the base portion and adapted to receive the edge of the wall with the inner surface of the base portion engaging the exposed edge and the inner surfaces of the finger portions engaging marginal sections of the wall directly adjacent thereto. A resilient, non-metalic coating covers outer surface portions of the base portion so as to provide an elongated resilient surface along the exposed edge, but has limited bounds that establish coating voids coextensive with the strip voids and therewith provide transverse openings into the channel. In addition, the coating forms over exposed edge lengths of the base portion between adjacent finger portions edge surfaces that intersect the outer surface of the base portion at angles substantially greater than 90° so as to provide smooth edges. Displacement of the finger portions enhances the operational flexibility of the grommet and the smooth edge surfaces prevent abrasion damage to engaged electrical wires.

According to other features of the invention, each of the finger portions comprises a lower portion fixed to one of the longitudinal edges and bent therefrom into the channel and an upper portion bent away from the channel so as to form with the lower portion a V-shaped section for the finger portions; the bottoms of the V-shaped sections being longitudinally aligned and disposed to engage the marginal sections of the wall. The V-shaped sections improve the spring characteristics of the finger portions and enhance the gripping capability thereof.

According to yet another feature of the invention, the lower portion of each finger portion is joined to the base portion by a terminal portion curved about the longitudinal axis. The curved terminal portions of the fingers further protect against abrasion damage to enveloped electrical wires.

DESCRIPTION OF THE DRAWINGS

These and other objects and features of the invention will become more apparent upon a perusal of the following description taken in conjunction with the accompanying drawings wherein.

DESCRIPTION OF THE PREFERRED EMBODIMENT

Figure 1:
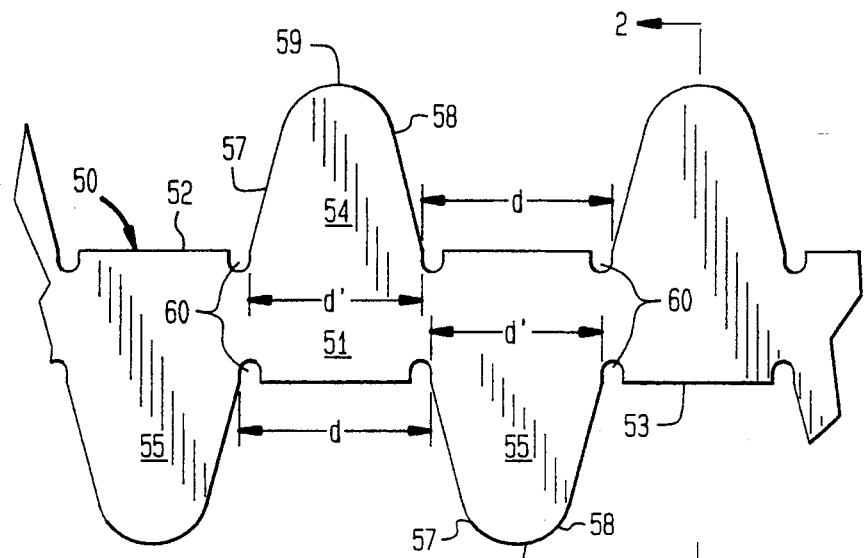
FIG. 1 is a partial plan view of a stamping used to create a base portion of the invention.
Figure 2:
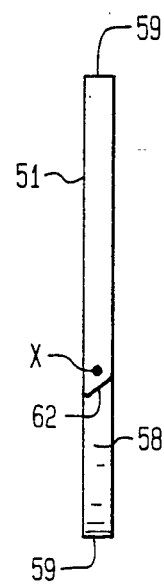
FIG. 2 is a cross sectional view taken along lines 2—2 of FIG. 1.
Figure 3:
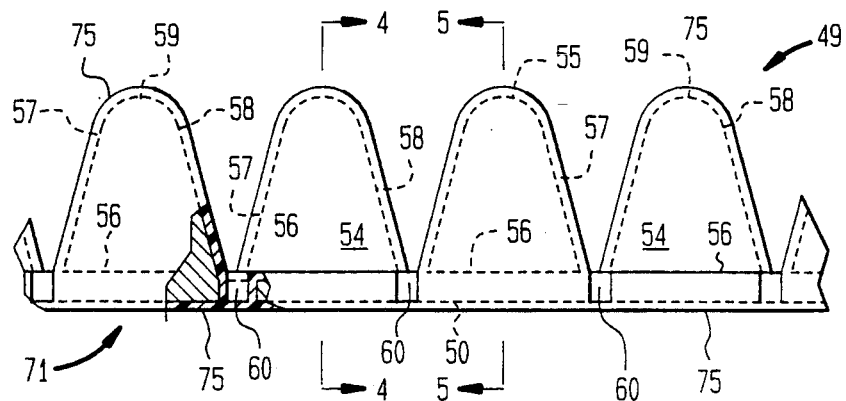
FIG. 3 is a side elevational view of a completed portion of a grommet strip according to the invention.
Figure 5:
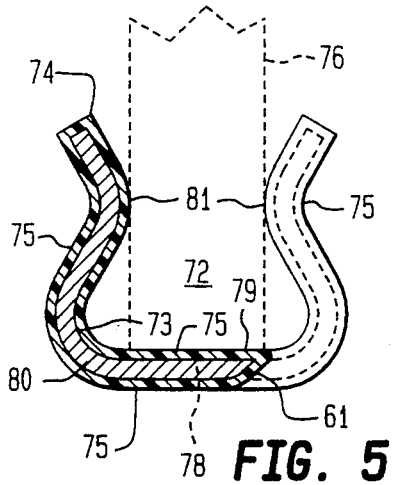
FIG. 5 is a cross sectional view taken along lines 5—5 of FIG. 3.
Figure 4:
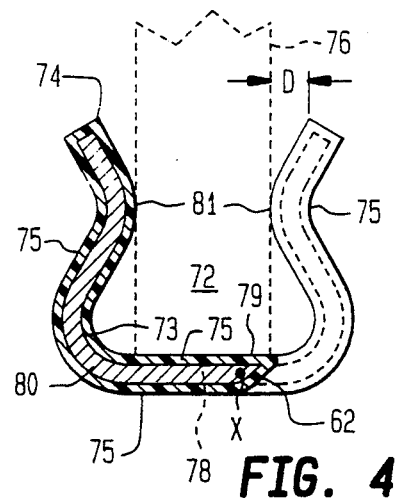
FIG. 4 is a cross sectional view taken along lines 4—4 of FIG. 3.

Referring to FIGS. 1-5 there is shown a grommet of the invention 49 including a spring tempered metal substrate strip 50. After being stamped and prior to being formed into a grommet strip as shown in FIGS. 3-5, the substrate strip 50 has the appearance shown in FIGS. 1 and 2. An elongated base portion 51 has parallel, longitudinally extending edges 52 and 53. Projecting from the longitudinal edge 52 are a plurality of finger portions 54, longitudinally spaced apart by a uniform distance d. Similarly projecting from the longitudinal edge 53 are a plurality of finger portions 55 also longitudinally spaced apart by a uniform distance d. Each of the finger portions 54, 55 has a bottom edge 56 joined to the base portion 51 and having a length d' slightly less than the distance d. Opposite to the bottom edges 56 are arcuate top edges 59 joined thereto by sloping side edges 57 and 58. Each of the side edges 57, 58 terminates with a slot 60 in the base portion 51. The slots 60 in the edge 52 are substantially aligned with the slots 60 in the edge 53. As shown in FIG. 1 the finger portions 54 are longitudinally spaced from the finger portions 55 such that each of the finger portions 54 is transversely aligned with a longitudinal space between a pair of finger portions 55 and each of the finger portions 55 is transversely aligned with a longitudinal space between a pair of finger portions 54. In addition, the longitudinal edges 52, 53 between adjacent finger portions 54, 55 are coined to create edges 70 (FIG. 2) curved about a longitudinal axis X extending therebetween. Thus, each of the edges 70 form an angle substantially greater than 90° with an intersecting surface 47 of the base portion 51.

After being stamped in the form shown in FIGS. 1 and 2, the substrate strip 50 is used to form a grommet 49 shown in FIGS. 3–5. During forming operations, all of the finger portions 54, 55 are bent into positions that extend substantially normally in the same direction from the base portion 51 so as to form therewith a channel 72. Formed between each pair of the finger portions 54, 55 is a strip void that communicates with the channel 72. A lower portion 73 of each finger portion 54, 55 between the bottom edge 56 and the top edge 59 thereof is bent into the channel 72 while an upper portion 74 is bent away from the channel 72. Thus, each of the finger portions 54, 55 is formed with a V-shaped section. In addition, a terminal portion 80 of each lower portion 73 joined to the base portion 51 is curved about the longitudinal axis X.

After being formed, the substrate strip 50 is coated with a suitable resilient, non-metalic coating 75 such as Nylon or other appropriate thermosetting or thermoplastic polymer. The coating 75 is applied to the surfaces of the entire base portion 51 and to the surfaces and top and side edges of the finger portions 54, 55 as shown in FIGS. 4 and 5. However, as shown in FIG. 3, the bounds of the coating 75 are limited so as to establish coating voids extensive with the strip voids between the finger portions 54, 55 and therewith forming transverse openings into the channel 72. The coating 75 produces a resilient surface covering 77 (FIGS. 4 and 5) over the surface 47 of the base portion that faces opposite to the channel 72 and over each of the base edges 70 a resilient edge length surface 61, 62 that forms with the surface covering 77 an angle substantially greater than 90°.

During use of the grommet strip 49, an exposed edge of a wall panel 76 (shown by dashed lines in FIG. 4) is forced into the elongated channel of a grommet strip 49. A length of the grommet strip 49 is cut to accommodate the length of a panel edge to be covered. When completely mounted, an outer edge 78 of the panel 76 engages an inner surface 79 of the base portion 51 and the longitudinally aligned bottoms 81 of the V-shaped finger portion sections engage marginal portions of the panel 76 to securely retain the grommet strip 49 in position. Preferably, the spacing D between outer edges 83 of the coated upper portions 74 and the coated V-shaped section bottoms 81 is less than 0.035 inches so as to prevent inadvertent entry of 22 gauge wire between the upper portions 74 and the wall 76. During mounting, the grommet strip 49 can be bent along arcs either parallel or transverse to the longitudinal axis thereof to accommodate panel edges of various shape including rectangular.

The grommet 49 exhibits a number of unique advantages. Because of the longitudinally alternating positions of the finger portions 54, 55, the grommet 49 can assume extremely small radii of curvature. The small radii of curvature are possible because of the substantial spacing d between each pair of both the finger portions 54 and the finger portions 55. That spacing also permits the fabrication of the substrate 50 in a progressive die since a transversely moving slide can be used to form the V-shaped finger portions 54, 55. Also advantageous is coating the edges of the finger portions 54, 55 so as to eliminate sharp edges thereon and thereby permit the use of a narrower steel substrate strip. In addition, abrasion damage to enveloped electrical wires is prevented by the curved surfaces created by bending the terminal portions 80 of the lower finger portions 73 and coining the edges 70 of the base portion 51 to provide a gradual sloping intersection between the surface covering 77 and the edge length surfaces 61, 62. A further advantage is provided by the slots 60 which facilitate bending of the grommet strip 49 in a plane defined by the base portion 51.

Obviously, many modifications and variations of the present invention are possible in light of the above teachings. For example, the edges 70 can be formed by chamfering instead of coining. It will be understood, also, that materials other than those specifically disclosed can be used such as carbon steel, spring tempered cold rolled steel, phosphor bronze or beryllium copper for the substrate strip 50 or a resilient elastomer for the coating 75. It is to be understood, therefore, that the invention can be practiced otherwise than as specifically described.

What is claimed is:

1. A grommet strip of the type including a spring tempered metal substrate strip having an elongated base portion and a plurality of discrete spaced apart finger portions extending in a common direction from each longitudinal edge of said base portion and substantially normal thereto, inner surfaces of said base and finger portions forming an elongated channel with an open end opposite to said base portion and adapted to receive an exposed edge of a wall with the inner surface of said base portion juxtaposed to the exposed edge and said inner surfaces of said finger portions engaging marginal sections of the wall directly adjacent to the edge, and wherein said finger portions extending from each of said edges are substantially spaced apart so as to establish therebetween strip voids each bounded by an exposed edge of said base portion and facing side edges of longitudinally adjacent said finger portions; and wherein the improvement comprises a resilient non-metallic coating providing an elongated resilient surface covering over a surface of the base portion facing opposite to said channel and providing over each of said exposed edges of said base portion a resilient edge length surface that forms with said elongated resilient surface covering an angle substantially greater than 90° and thereby providing between said surface covering and said edge length surfaces a gradual transition that reduces abrasion to insulated electrical wires retained by said grommet strip.

2. A grommet strip according to claim 1 wherein said coating is limited so as to provide coating voids coextensive with said strip voids and therewith forming into said elongated channel transverse openings that enhance the longitudinal flexibility of said strip.

3. A grommet strip according to claim 1 wherein said substrate strip is a unitary stamping and said finger portions extending from one of said edges are longitudinally displaced with respect to said finger portions extending from the other of said edges so as to be transversely non aligned therewith.

4. A grommet strip according to claim 3 wherein each of said finger portions comprises a bottom edge fixed to one of said longitudinal edges, a top edge substantially shorter than said bottom edge, and side edges that slope toward each other between said bottom and top edges.

5. A grommet strip according to claim 4 wherein said finger portions extending from each of said edges are separated by spaces of substantial length and have bottom longitudinally extending edges of substantial length joined to one of said edges of said base portion.

6. A grommet strip according to claim 1 wherein each of said finger portions comprise a lower portion joined to said longitudinal edge and an upper portion extending from said lower portion and said lower portion is bent into said channel and said upper portion is bent away from said channel so as to provide said finger portion with a V-shaped section.

7. A grommet strip according to claim 6 wherein the bottoms of said V-shaped sections are longitudinally aligned and adapted to engage marginal sections of the wall.

8. A grommet strip according to claim 7 wherein resiliently coated outer edges of said upper portions are longitudinally aligned and laterally spaced from said resiliently coated bottoms of said V-shaped sections by less than 0.035 inches.

9. A grommet strip according to claim 8 wherein each said lower portion has a terminal portion joined to said longitudinal edge and curved about said axis.

10. A grommet strip according to claim 9 wherein each of said exposed edge lengths is curved about said axis.

11. A grommet strip according to claim 10 wherein said base portion is completely covered by said coating.

12. A grommet strip according to claim 1 wherein each of said edge length surfaces is curved about an axis extending between said adjacent finger portions.

13. A grommet strip according to claim 1 wherein each of said exposed edges forms an angle substantially greater than 90° with a surface of said base portion facing opposite to said channel.

14. A grommet strip according to claim 13 wherein each of said exposed edge lengths is curved about an axis extending between said adjacent finger portion.

15. A grommet strip according to claim 14 wherein said exposed edge lengths are curved by a coining operation, 16. A grommet strip according to claim 13 wherein each of said finger portions comprise a lower portion joined to said longitudinal edge and an upper portion extending from said lower portion and said lower portion is bent into said channel and said upper portion is bent away from said channel so as to provide said finger portion with a V-shaped section, 17. A grommet strip according to claim 16 wherein the bottoms of said V-shaped sections are longitudinally aligned and adapted to engage marginal sections of the wall.

18. A grommet strip according to claim 17 wherein resiliently coated outer edges of said upper portions are longitudinally aligned and laterally spaced from said resiliently coated bottoms of said V-shaped sections by less than 0.035 inches.

19. A grommet strip according to claim 1 wherein each said exposed length defines a plurality of slots each disposed adjacent to one of said side edges.

* * * * *